US007987326B2

(12) United States Patent
Nguyen

(10) Patent No.: US 7,987,326 B2
(45) Date of Patent: Jul. 26, 2011

(54) PERFORMING BACKUP OPERATIONS FOR A VOLUME GROUP OF VOLUMES

(75) Inventor: Lu Nguyen, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/751,588

(22) Filed: May 21, 2007

(65) Prior Publication Data
US 2008/0294859 A1 Nov. 27, 2008

(51) Int. Cl.
G06F 12/00 (2006.01)
(52) U.S. Cl. . 711/162; 711/161; 711/165; 711/E12.069; 707/645; 707/646; 707/652
(58) Field of Classification Search .......... 711/161
See application file for complete search history.

(56) References Cited

U.S. PATENT DOCUMENTS

| 5,454,099 | A | 9/1995 | Myers et al. |
| 5,574,906 | A | 11/1996 | Morris |
| 5,606,689 | A * | 2/1997 | Nakagawa .......... 707/206 |
| 5,813,017 | A | 9/1998 | Morris |
| 6,269,381 | B1 * | 7/2001 | St. Pierre et al. ....... 707/202 |
| 6,941,328 | B2 | 9/2005 | Cannon |
| 7,085,904 | B2 | 8/2006 | Mizuno et al. |
| 7,146,474 | B2 | 12/2006 | Nguyen et al. |
| 7,263,590 | B1 * | 8/2007 | Todd et al. ............. 711/165 |
| 2003/0005248 | A1 | 1/2003 | Selkirk et al. |
| 2003/0154220 | A1 | 8/2003 | Cannon |
| 2004/0172512 | A1 * | 9/2004 | Nakanishi et al. ...... 711/162 |
| 2004/0260896 | A1 * | 12/2004 | Werner et al. .......... 711/162 |
| 2005/0086443 | A1 | 4/2005 | Mizuno et al. |
| 2005/0114728 | A1 | 5/2005 | Aizawa et al. |
| 2005/0187992 | A1 * | 8/2005 | Prahlad et al. .......... 707/204 |

(Continued)

FOREIGN PATENT DOCUMENTS
EP 0410630 A 1/1991
(Continued)

OTHER PUBLICATIONS

"How Volume Shadow Copy Service Works", Microsoft, Mar. 28, 2003, pp. 1-7.

(Continued)

Primary Examiner — Reginald G Bragdon
Assistant Examiner — Arvind Talukdar
(74) Attorney, Agent, or Firm — David W. Victor; Konrad Raynes and Victor LLP

(57) ABSTRACT

Provided are a method, system, and article of manufacture for performing backup operations for a volume group of volumes. Information on a volume group associating a plurality of volumes and backup settings is maintained. A volume group is selected to which the backup settings apply. A volume group associates hosts and volumes, indicating the hosts that are enabled to access the volumes in the volume group. Automatic backup operations for the selected volume group are invoked to generate backup information for the volume group indicating backups performed with respect to the volumes associated with the volume group, process the backup information for the volume group to determine whether to perform a backup with respect to the volume group according to the backup settings, and backup each volume in the volume group in response to determining to perform the backup operation for the volume group.

32 Claims, 9 Drawing Sheets

U.S. PATENT DOCUMENTS

| | | |
|---|---|---|
| 2005/0267923 A1 | 12/2005 | Tabuchi et al. |
| 2006/0085575 A1 | 4/2006 | Hosouchi et al. |
| 2007/0300033 A1* | 12/2007 | Kano .......................... 711/170 |
| 2008/0059733 A1* | 3/2008 | Otani .......................... 711/162 |
| 2008/0082748 A1* | 4/2008 | Liu et al. ..................... 711/114 |

FOREIGN PATENT DOCUMENTS

| | | |
|---|---|---|
| EP | 0899662 A1 | 3/1999 |

OTHER PUBLICATIONS

G. Castets, et al., "IBM System Storage DS8000 Series: Copy Services with IBM System z", IBM Corp., Document No. SG24-6787-02, Dec. 2006, pp. 1-794.

PCT International Search Report and Written Opinion mailed Oct. 15, 2008 for Application No. PCT/EP2008/055550 filed May 6, 2008.

* cited by examiner

Volume Group Information

Backup Settings

Volume Group Backup Information

Backup Set Entry

US 7,987,326 B2

PERFORMING BACKUP OPERATIONS FOR A VOLUME GROUP OF VOLUMES

BACKGROUND OF THE INVENTION

1. Field of the Invention

The present invention relates to a method, system, and article of manufacture for performing backup operations for a volume group of volumes.

2. Description of the Related Art

In a backup computing environment, backup client programs transfer client files in a client file system to a backup server program to backup the files in a backup image. The Tivoli® Storage Manager (TSM) backup archive client may backup all client files by transferring an object including the client files to a TSM backup server that manages backup objects for multiple clients. (Tivoli is a registered trademark of International Business Machines Corporation in the United States and other countries)

Volumes configured in a storage system may be organized into volume groups, where hosts are given access to a volume group in order to access the volumes assigned to that volume group. Storage administrators typically manually invoke backup operations to backup volumes and then manually query the storage server and backup software to determine the status of backup operations with respect to the volumes. The storage administrator may then manually track the status of backup operations and multiple backups created for each volume.

SUMMARY

Provided are a method, system, and article of manufacture for performing backup operations for a volume group of volumes. Information on a volume group associating a plurality of volumes and backup settings is maintained. A volume group is selected to which the backup settings apply. A volume group associates hosts and volumes, indicating the hosts that are enabled to access the volumes in the volume group. Automatic backup operations for the selected volume group are invoked to generate backup information for the volume group indicating backups performed with respect to the volumes associated with the volume group, process the backup information for the volume group to determine whether to perform a backup with respect to the volume group according to the backup settings, and backup each volume in the volume group in response to determining to perform the backup operation for the volume group.

In a further embodiment, a backup of the volume group completes in response to successfully backing-up each volume in the volume group. Indication is made of the completed backup for the volume group in the backup information for the volume group in response to completing the backup of the volume group.

In a further embodiment, the backup settings indicate a backup frequency. The processing of the backup information on the volume group to determine whether to perform the backup operation comprises determining a most recent completed backup from the backup information for the volume group and determining whether a difference of a current time and the most recent completed backup exceeds the backup frequency. The backup is performed with respect to each volume in the volume group in response to determining that the difference of the current time and the most recent completed backup exceeds the backup frequency.

In a further embodiment, backing-up each volume comprises allocating a target volume for the backed-up volume and creating a virtual copy of the volume, wherein the backup is completed in response to creating the virtual copy, and copying data from the volume indicated in the virtual copy to the target volume. The volumes to backup and target volumes are implemented in hard disk drives.

In a further embodiment, the backup settings indicate a maximum number of backups to maintain for the volume group. A target volume for the backed-up volume is allocated. A determination is made as to whether the backup information for the volume group indicates a number of completed backups for the volume group equals the maximum number of backups. Allocating the target volumes for the volumes in the volume group comprises using the target volumes from a previous backup of the volume group in response to determining that the number of completed backups for the volume group equals the maximum number of backups.

In a further embodiment, allocating the target volume for each volume in the volume group in response to determining that the number of completed backups for the volume group does not equal the maximum number of backups comprises determining a target volume having at least one of an equal size, performance, and reliability as the volume to backup. The allocated target volume comprises the determined target volume.

In a further embodiment, a list of completed backups of the volume group is rendered at different times. User selection is received of one of the completed backups of the volume group from the rendered list. Each backed-up volume associated with the selected completed backup of the volume group is restored in response to the user selection of the completed backup of the volume group.

In a further embodiment, the automatic backup operations for the volume group further comprise initiating a condition for each volume in the volume group to not accept further writes for the volume until the backup of the volume completes.

In a further embodiment, initiating the condition further comprises communicating with applications that write to the volumes in the volume group to quiesce all writes to the volumes in the volume group. Communication is made with the applications to end quiescing of writes to the volumes in the volume group in response to completing the backup of the volumes in the volume group.

In a further embodiment, the automatic backup operations for the volume group further comprises communicating with a storage server to cause the storage server to perform consistency operations on the volumes in the volume group to ensure that the data in the backup of each volume in the volume group is part of a consistency group.

In a further embodiment, the consistency operations performed by the storage server comprises destaging cached writes to the volumes in the volume group to a storage system including the volumes, wherein the volumes are backed-up in response to completing the destaging of the cached writes to the volumes in the storage system.

In a further embodiment, selecting a volume group to which the backup settings apply and defining the backup settings associated with the volume group are performed automatically without user intervention

DETAILED DESCRIPTION

Figure 1:
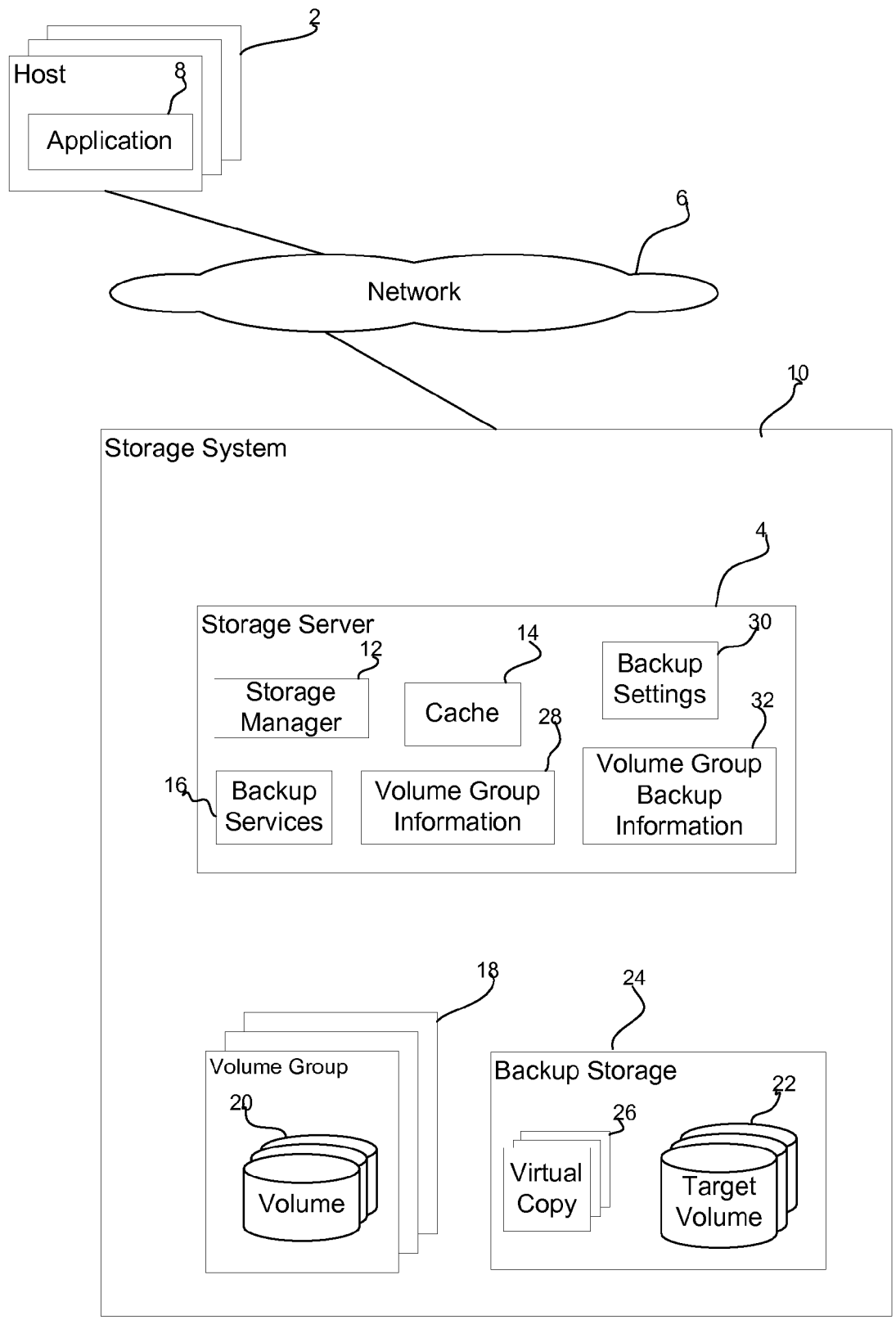
FIG. 1 illustrates an embodiment of a network backup computing environment.

FIG. 1 illustrates an embodiment of a network computing environment. One or more host systems 2 communicate with a storage system 2 over a network 6. The hosts 2 include one or more applications 8 that communicate Input/Output (I/O) requests directed to volumes in a storage system 10 via the storage server 4, which manages access to the storage system 10.

The storage server 4 comprises hardware and/or software implemented in the storage system 2 to manage I/O requests to storage and backup operations. The storage server 4 includes a storage manager 12 that manages I/O requests from hosts 2 directed to volumes in the storage system 10 and cache 14 to buffer read and write data being transferred between the hosts 2 and storage system 10. The storage server 4 further includes backup services 16 that perform backup related operations with respect to volumes configured in the storage system 10.

In one embodiment, volumes 20 configured in the storage system 10 may be organized in one or more volume groups 20. One or more hosts 2 are assigned to a volume group 18, which comprises the set of volumes 20 the assigned hosts 2 may access. Volumes 20 in the volume groups 20 may be backed-up in corresponding target volumes 22 in a backup storage 24. Further, a virtual copy 26 may be created for each volume 20 in the volume group.

The virtual copy 26 comprises the data structures and information that represent the virtual copy, such as a Snapshot copy, FlashCopy®, etc. (FlashCopy is a registered trademark of International Business Machines Corp. in the United States and other countries). A virtual copy comprises a point-in-time copy of a data set that is immediately created without copying the underlying data. The virtual copy 26 may include a bitmap representing each track or block in the volume subject to the virtual copy and whether the data has been updated since the point-in-time of the virtual copy. After the point-in-time the virtual copy was created, source data in the source volume subject to the virtual copy is saved in a storage pool for the virtual copy before being overwritten. In this way volume data as of the point-in-time is maintained in the source volume location or in the associated storage pool. A background copy operation may be initiated using the virtual copy 26 to copy volume data at the point-in-time from the volume or storage pool to the target volume 22. The virtual copies 26 may be maintained in the storage server 4 or storage system 10. Further, the virtual copies 26 may be stored in the target volumes 22.

The hosts 2 that communicate with the storage server 4 may comprise suitable computational devices known in the art, such as servers, desktop computers, workstations, mainframes, hand held computing devices, telephony devices, etc. The storage server 4 may comprise a suitable server system known in the art, such as an enterprise storage server, etc. The storage system 10 may be implemented in a storage system known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc. The network 6 may comprise a Wide Area Network (WAN), Local Area Network (LAN), Storage Area Network (SAN), wireless network, the Internet, an Intranet, peer-to-peer network, etc. The hosts 2, storage server 4, and storage system 10 may communicate over a same network 6 or separate networks.

The volumes 20 in the volume groups 18 may be stored in separate storage devices in the storage system 10 from the backup storage 24 storing target volumes 22 providing backup-data for the volumes 20.

The storage server 4 further maintains volume group information 28 providing information on volume groups configured in the storage system 10, backup settings 30 providing parameters to use for backup operations and the volume groups 18 to which the settings apply, and volume group backup information 32 providing information on backups performed with respect to the volumes in a volume group. In one embodiment, a volume group backup is completed upon completion of the backup of all the volumes 20 in a volume group 18.

Figure 2:
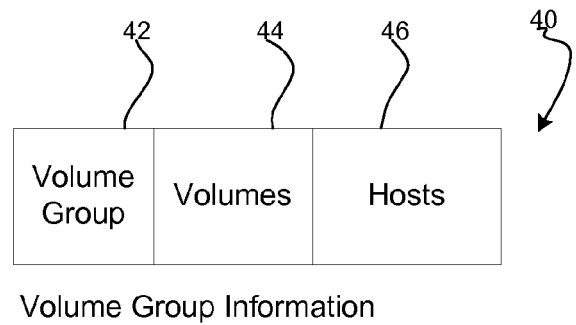
FIG. 2 illustrates an embodiment of volume group information.

FIG. 2 illustrates an embodiment of an instance 40 of the volume group information 28 for a volume group the storage manager 12 maintains, including a volume group identifier 42; the volumes 44 assigned to the volume group 42; and hosts 56 assigned to the volume group 52. Hosts 2 assigned to a volume group 18 may access the volumes 20 in the assigned volume group 18. The volume group information 40 may be maintained and created by the storage manager 12 to manage host 2 access to storage volumes 20. The backup services 16 may access the volume group information 40.

Figure 3:
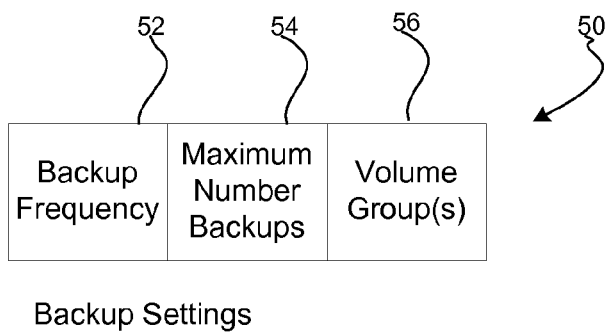
FIG. 3 illustrates an embodiment of backup settings.

FIG. 3 illustrates an embodiment of an instance 50 of the backup settings 30 the backup services 16 maintains. An instance of the backup settings 50 includes a backup frequency 52 indicating a frequency at which backups of the indicated volume groups 56 are to occur and a maximum number of backups 54 that may be maintained in the backup storage 24 for the associated volume groups 56. In one embodiment, the backup services 16 may maintain default backup settings 50 used for all volume groups for which backup services have been requested. Alternatively, the backup services 16 may create different instances of backup settings 50 for different backup volume groups 56.

Each volume group is assigned the backup frequency 52 and maximum backups 54 parameters from backup settings 50, or uses default values. Other backup parameters that can optionally be set by the administrator for volume groups include: 1) priority/importance; 2) backup destination (which target volumes or which pool of volumes to backup the data); 3) snapshot method to use (incremental or non-incremental, background copy or no-copy, persistent or non-persistent); 4) expiration date (if any); 5) disk type (RAID 0, 1, 10, 5, or 6, SCSI, SATA, Fibre Channel, etc.); and 6) disk performance (7200 RPM, 10,000 RPM, 15,000 RPM, etc.). These optional parameters can be used by the backup services 16 to decide which target volumes to use and how to create the backup.

Figure 4:
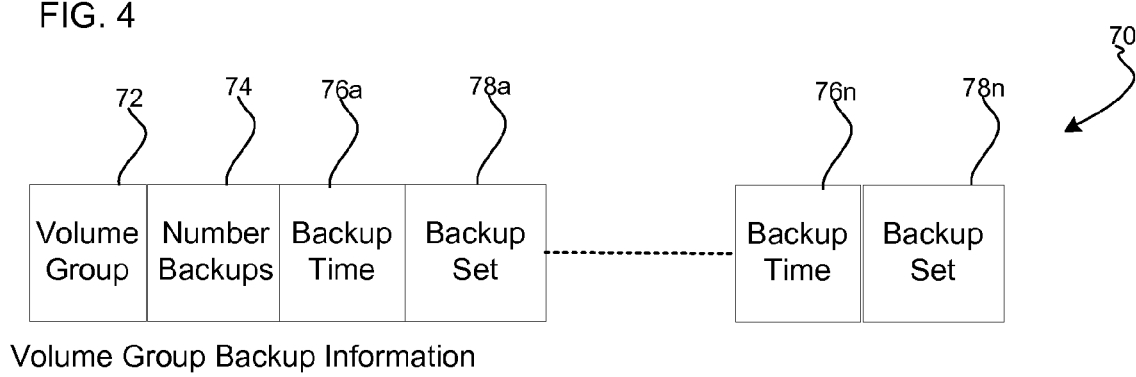
FIG. 4 illustrates an embodiment of volume group backup information.

FIG. 4 illustrates an embodiment of an instance 70 of the volume group backup information 32 the backup services 16 maintains for each volume group 18 subject to backup operations, such as indicated in the volume groups field 56 (FIG. 2) of the backup settings 50 (FIG. 3). The volume group backup information 70 may include: a volume group identifier 72; a number of backups 74 maintained for the volume group 72; and backup information for each maintained backup including a backup time 76a ... 76n of the backup and a backup set 78a ... 78n providing information on the backup for each volume in the volume group 72. If the backup operation comprises a virtual copy, such as a Snapshot copy, then the information for each backup may include information for the virtual copy 26, such as the data structures providing information on the virtual copy 26.

Figure 5:
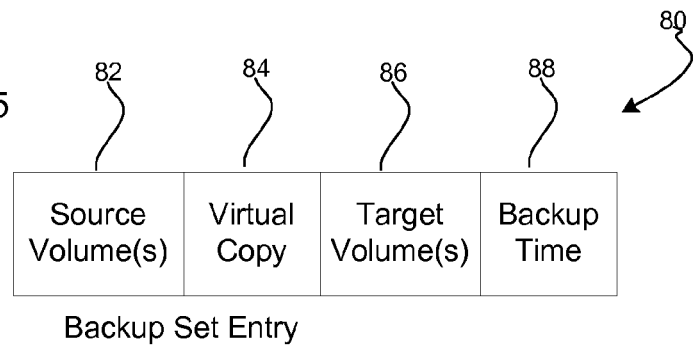
FIG. 5 illustrates an embodiment of a backup set entry in the volume group backup information.

FIG. 5 illustrates an embodiment of a backup set entry 80, wherein each backup set 78a ... 78n in the volume group information 70 includes an entry 80 for each volume 20 in the volume group 18 that is backed-up. A backup set entry 80 identifies: one or more source volumes 82 in the volume group that were backed-up; a virtual copy 84 of the source volume 82; one or more target volumes 86 to which a copy of the corresponding one or more source volumes 82 are written; and the backup time 88, e.g., point-in-time of the virtual copy 84. In certain embodiments, the data may not be copied to a target volume 86 and/or a target volume 86 may not be indicated or allocated. The backup set may also contain information about the Snapshot method used (incremental or non-incremental, background copy or no-copy, persistent or non-persistent) and potentially other information such as expiration date.

Figure 6:
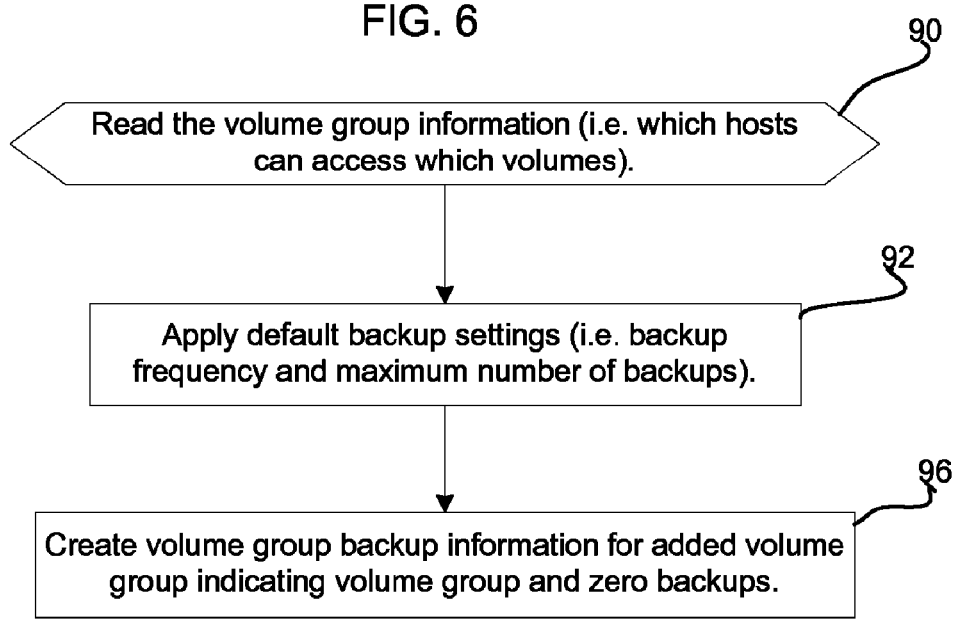
FIGS. 6 and 7 illustrate embodiments of operations to associate a volume group with backup settings.

FIG. 6 illustrates an embodiment of operations performed by the backup services 16 to automatically associate backup settings 30 with volume groups 18. At block 90, the backup services 16 reads the volume group information 28. The volume group information 28 indicates hosts 46 that can access the volumes 44 specified in the volume group. The default backup settings (e.g., backup frequency and maximum number of backups) are applied (at block 92) to the volume group 18. The backup services 16 creates (at block 94) volume group backup information 28 for an added volume group 18 indicating the volume group 72 and zero backups in number backups field 74. The operations of FIG. 6 to associate backup settings 30 with volume groups 18 may be performed by the backup services 16 automatically without user intervention. Further, the backup settings can be defined automatically from predefined settings.

Figure 7:
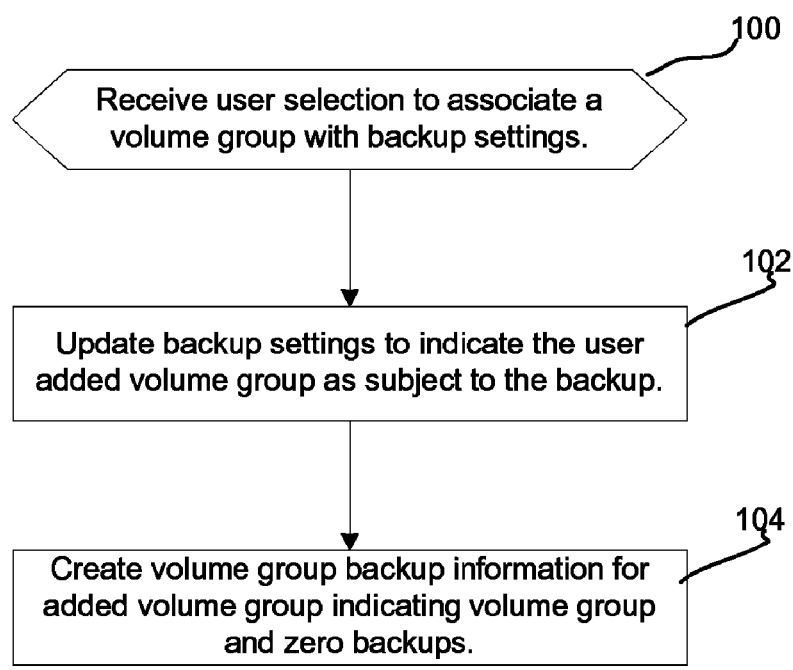

FIG. 7 illustrates an embodiment of operations performed by the backup services 16 to enable users to update the backup settings 50. Upon receiving (at block 100) user selection to associate a volume group 18 with backup settings 50 (FIG. 3), the backup services 16 updates (at block 102) the backup settings 50 to indicate the user selected volume group as subject to the backup. Further, volume group backup information 70 is created (at block 104) for the added volume group indicating the volume group and zero backups.

In certain embodiments, the volume groups may be associated with default settings if there is no specific user association of backup settings and volume groups per the operations of FIG. 7.

Figure 8:
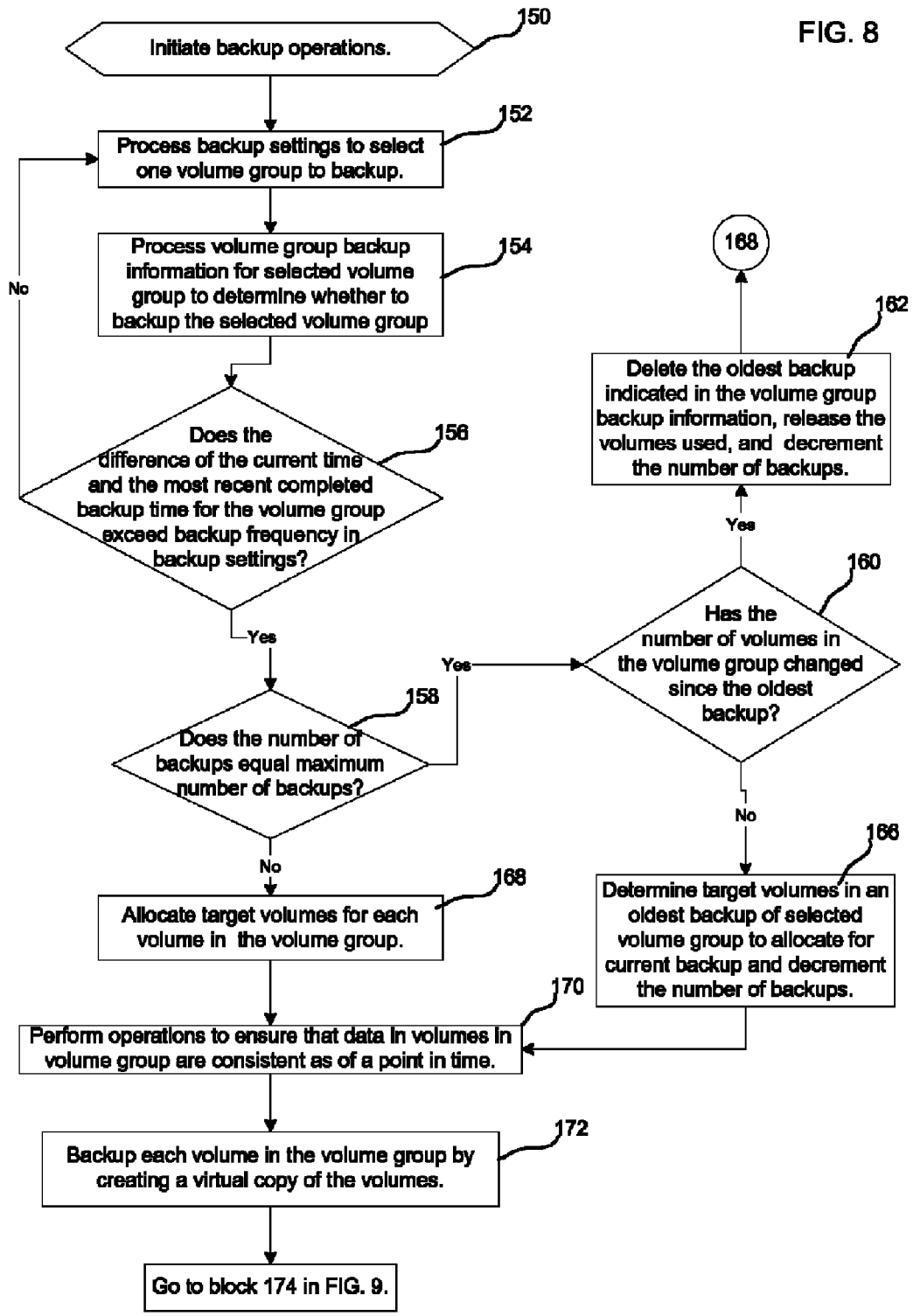
FIGS. 8 and 9 illustrate an embodiment of operations to backup a volume group.
Figure 9:
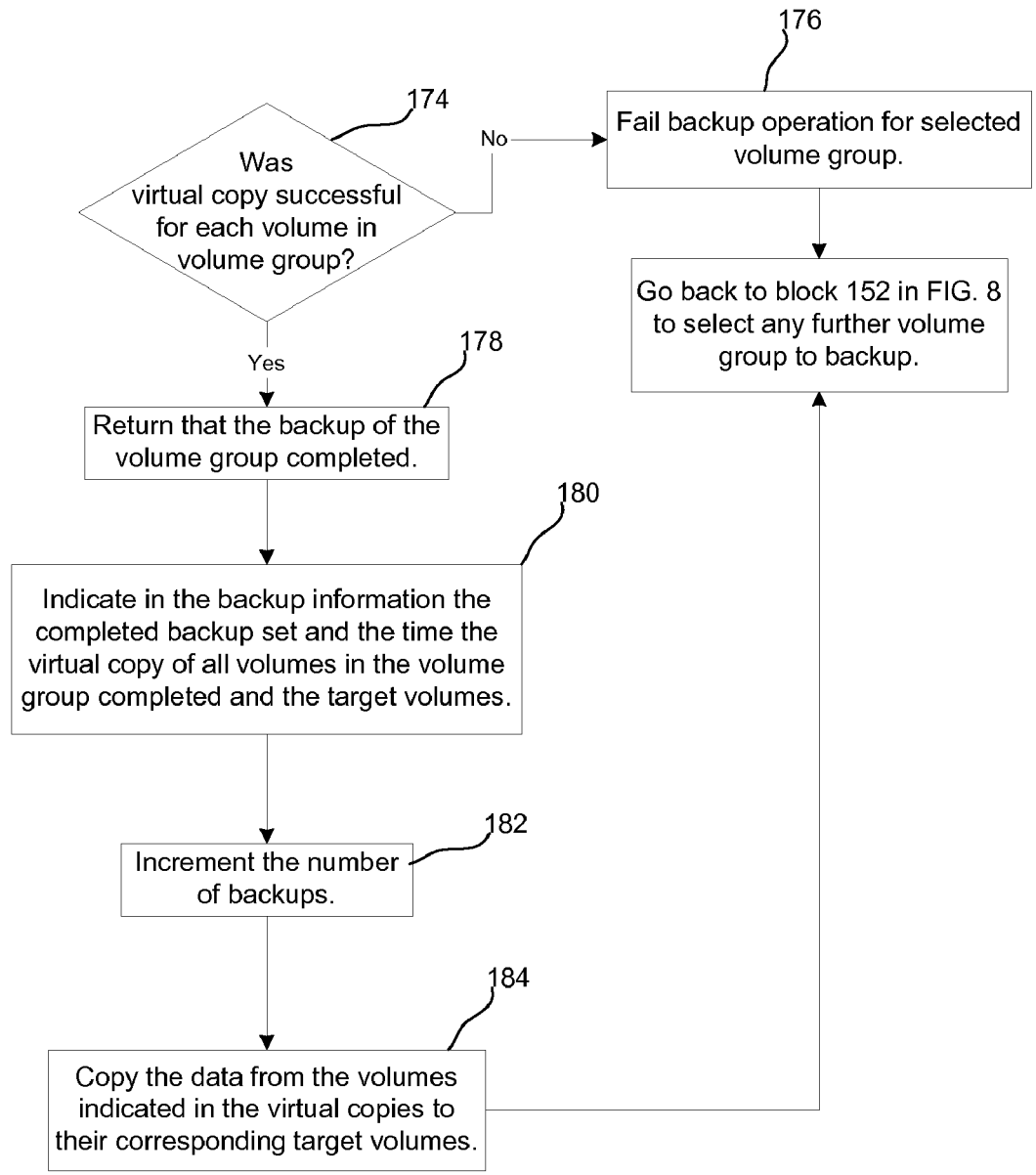

FIGS. 8 and 9 illustrate an embodiment of operations performed by the backup services 16 to automatically perform backup operations with respect to volume groups 18. The backup operations of FIGS. 8 and 9 may be initiated according to a periodic or scheduled time, when the storage system 10 is idle or in response to a manual user initiation. With respect to FIG. 8, upon initiating (at block 150) backup operations, the backup services 16 processes (at block 152) backup settings 50 (FIG. 3) to select one volume group 18 from the indicated volume groups 56 to backup. If there are multiple instances 50 of the backup settings 30, then the backup services 16 may process each instance 50. The backup services 16 processes (at block 154) the volume group backup information 70 for the selected volume group to determine whether to backup the selected volume group 18. If (at block 156) a difference of a current system time and the most recent completed backup time 76a ... 76n for the volume group exceeds the backup frequency 52 indicated in the backup settings 50 being processed, then the processed backup settings 50 require a further backup of the volume group 18. The considered backup frequency 52 may be expressed as a time interval, etc. If it is not the time for a backup, e.g., the difference of the current and most recent backup times does not exceed the backup frequency, then control proceeds back to block 152 to select a next volume group indicated in the volume groups 56 of the backup settings 50.

If (at block 156) the checking of the backup frequency 52 indicates that a further backup of the selected volume group 18 is required, then the backup services 16 determines (at block 158) whether the number of backups 74 indicated in the volume group backup information 70 for the selected volume group 18 equals a maximum number of backup 54 indicated in the backup settings 50 being processed. If the number of backups 78a ... 78n maintained for the selected volume group 18, which may be indicated in field 74, is at a maximum number 54 and if (at block 160) the number of volumes 20 configured in the system has changed since the oldest backup 76a ... 76n, then the backup services 16 deletes (at block 162) the oldest backup indicated in the volume group backup information 70, release the volumes used, and decrements the number of backups 74. If (at block 160) the number of volumes 18 configured in the system has not changed, then the backup services 16 determines (at block 166) target volumes 22 in an oldest backup 78n of the selected volume group 18 to allocate for the current backup, i.e., the backup having the oldest backup time 76a ... 76n, and decrements the number of backups 74. At block 166, the backup services 16 reuses the target volumes 22 from a previous backup when the maximum number of backups is maintained for the volume group 18. If (at block 158) the number of backups maintained for the volume group is not at a maximum number 54 indicated in the considered backup settings 50 or after deleting the oldest backup (at block 162), the backup services 16 allocates (at block 168) new target volumes in the backup storage 24 for each volume 20 in the volume group 18. In one embodiment, the backup services 16 may allocate target volumes 22 that have a same size, are of a same storage type, have a same performance and reliability, etc., as the source volume 20 subject to the back-up.

Figure 10:
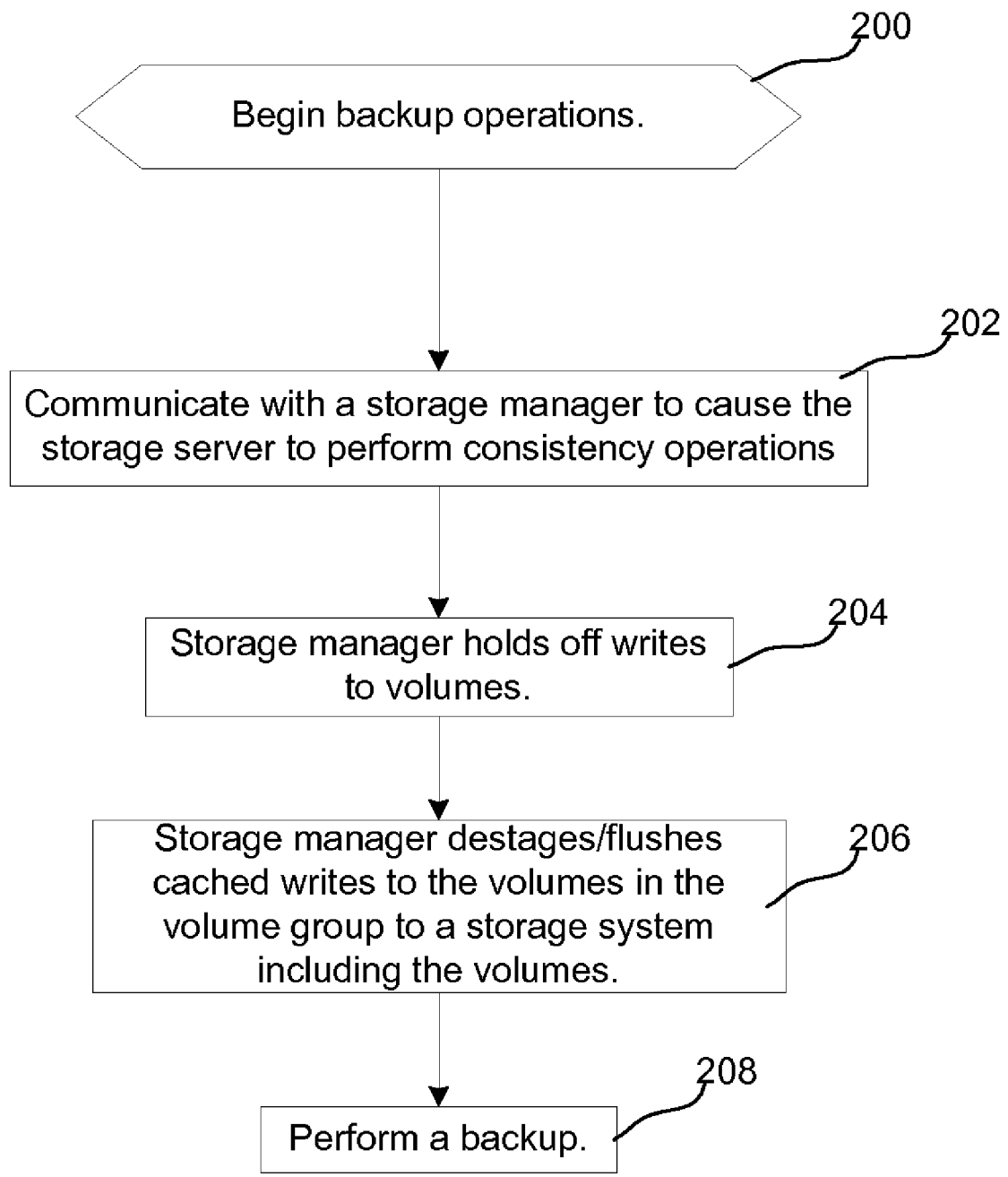
FIGS. 10 and 11 illustrate embodiments of backup operations that maintain the consistency of the volumes in a volume group as of a point-in-time.
Figure 11:
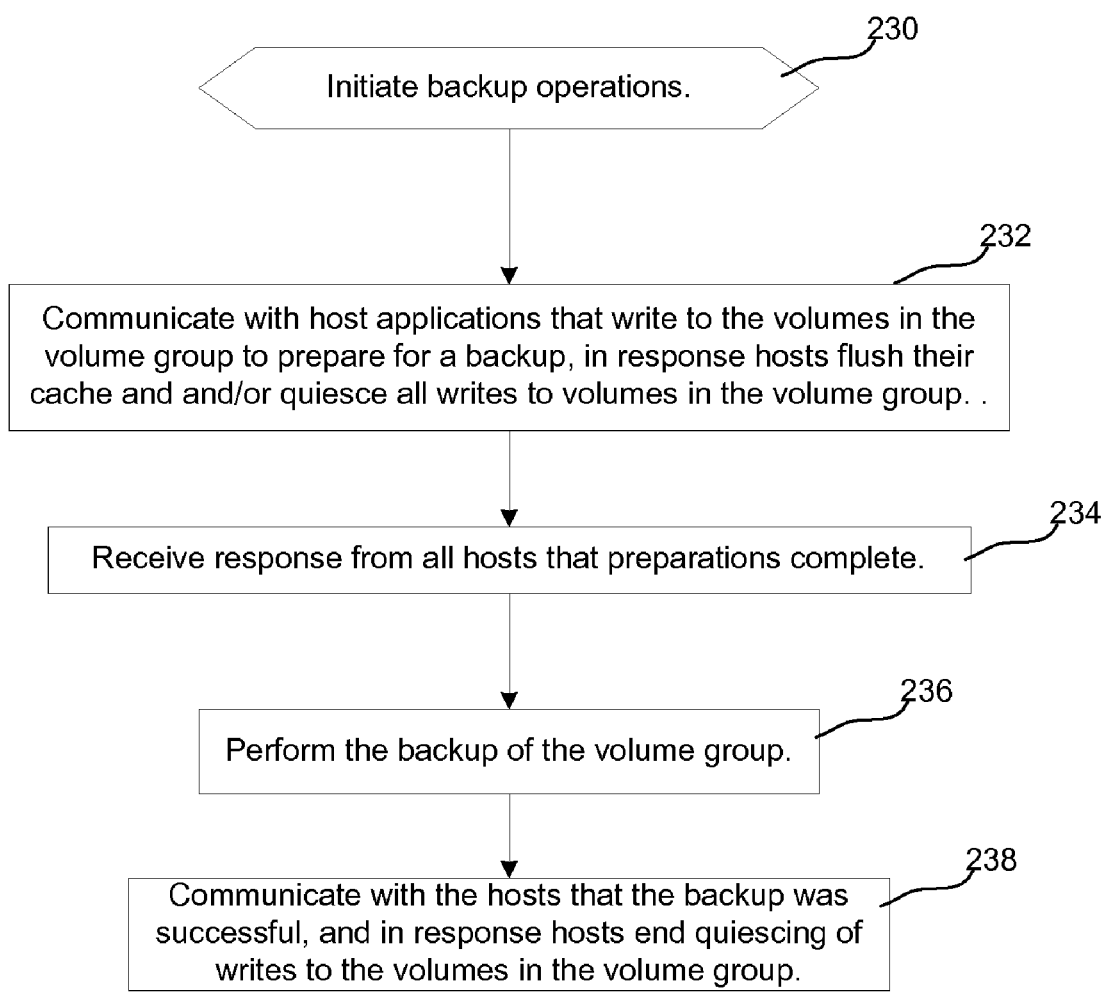

The backup services 16 may further perform operations (at block 170) to ensure that data in volumes 20 in the selected volume group 18 are consistent as of a point-in-time. In one embodiment, to insure consistency across the volumes in the selected volume group, the backup services 16 may initiate a condition for each volume in the volume group to not accept further writes for the volume until the backup of the volume completes. FIGS. 10 and 11, discussed below, provide additional embodiments of operations the backup services 16 performs to ensure that data in the volumes 20 in the selected volume group 18 to backup are consistent as of a point-in-time.

The backup services 16 backs-up (at block 172) each volume 20 in the volume group 18 by creating a virtual copy 26 for each volume 20 in the volume group 18. With respect to FIG. 9, if (at block 174) the virtual copy 26 was not successfully created for each volume 20 in the volume group 18, then the backup operation for the selected volume group 18 is failed (at block 176) and control proceeds back to block 152 in FIG. 8 to select another volume group 18 associated with one of the backup settings 30 to backup. In embodiments where the backup operation comprises a backup operation other than a virtual copy, such as a full data backup to the target volumes 22 that does not complete until all the data is copied to the target volumes 22, then the backup is only successful if all the backup operations performed with respect to all the volumes 20 in the selected volume group 18 is successful.

If (at block 174) the virtual copy or other backup operation was successful for each volume 20 in the selected volume group 18, then the backup services 16 returns (at block 178) success to the completion of the backup of the selected backup group 18. The completed backup set 78a, the time 76a the virtual copy of all volumes in the volume group completed, and the target volumes 22 allocated for the volumes in the volume group 18 are indicted (at block 180) in the backup information 70 for the selected volume group 18. In one embodiment, the backup services 16 adds a backup set entry 80 (FIG. 5) for the completed backup for each volume 20 in the volume group 18 indicating the source volume 82, virtual copy 84, target volume 86, and backup time 88 for the backup of that specific volume. In one embodiment, the backup operation for the volume group completes in response to creating the virtual copy 26 for every volume 20 in the volume group 18. The backup time 76a for the volume group 18 may indicate a time at which all the individual volumes completed their backup, which may comprise the latest backup time 88 of the volumes 82 in the volume group 18. The number of backups 74 is incremented (at block 182). The backup services 16 may initiate a background copy operation (at block 184) to copy the data indicated in the virtual copy 26 to the target volume 22, by copying data from the source volume 20. Further, data in the volume 20 as of the point-in-time of the virtual copy 26 may be copied over to the target volume 22 before the data is updated in the source volume 20. From block 176 or 184, control proceeds to block 152 in FIG. 8 to select another volume group to backup.

FIG. 10 illustrates an embodiment of operations the backup services 16 performs to maintain the consistency of the data in the volumes 20 of the volume group 18 subject the backup operation. These operations may be performed as part of a virtual copy or FlashCopy operation. Upon beginning (at block 200) backup operations, the backup services 16 communicates (at block 202) with the storage manager 12 of the storage server 4 to cause the storage server 4 to perform consistency operations. In one embodiment, the consistency operations performed by the storage manager 12 in response to the communication comprises holding off (at block 204) writes to the volumes in the volume group 18, such as by returning a "queue full" or "LONG_BUSY" in response to host I/O requests. The storage manager 12 may further destage or flush (at block 206) cached writes in the cache 14 to the volumes 20 in the volume group 18 to the volumes 20 in the storage system 10. In this way, all the updated data as of the point-in-time is destaged to the volume in the storage system 10 to be included in the backup operation. The backup of the volume group 18 is then performed (at block 208)

FIG. 11 illustrates an embodiment of a backup operation the backup services 16 performs to maintain the consistency of the data in the volumes 20 of the volume group 18 subject the backup operation. Upon initiating (at block 230) backup operations, the backup services 16 communicates (at block 232) with host applications 8 that write to the volumes 20 in the volume group 18 to prepare for a backup. In response, the hosts 2 flush their cache to write any modified writes to the storage system 10 and/or quiesce all writes to volumes in the selected volume group 18. In further embodiments, additional operations may be performed to ensure data consistency and prepare for the backup. Upon receiving (at block 234) indication from the hosts 2 that backup preparations completed, the backup service 16 performs (at block 236) the backup of the selected volume group 18. In one embodiment, the backup may be performed using the operations of FIG. 10, which is performed as part of a virtual copy or FlashCopy operation. Upon completing the backup, the backup services 16 communicates (at block 238) with the host 2 that the backup was successful. In response, the hosts end quiescing of writes to the volumes 20 in the selected volume group 18 and end other backup related preparation operations.

Figure 12:
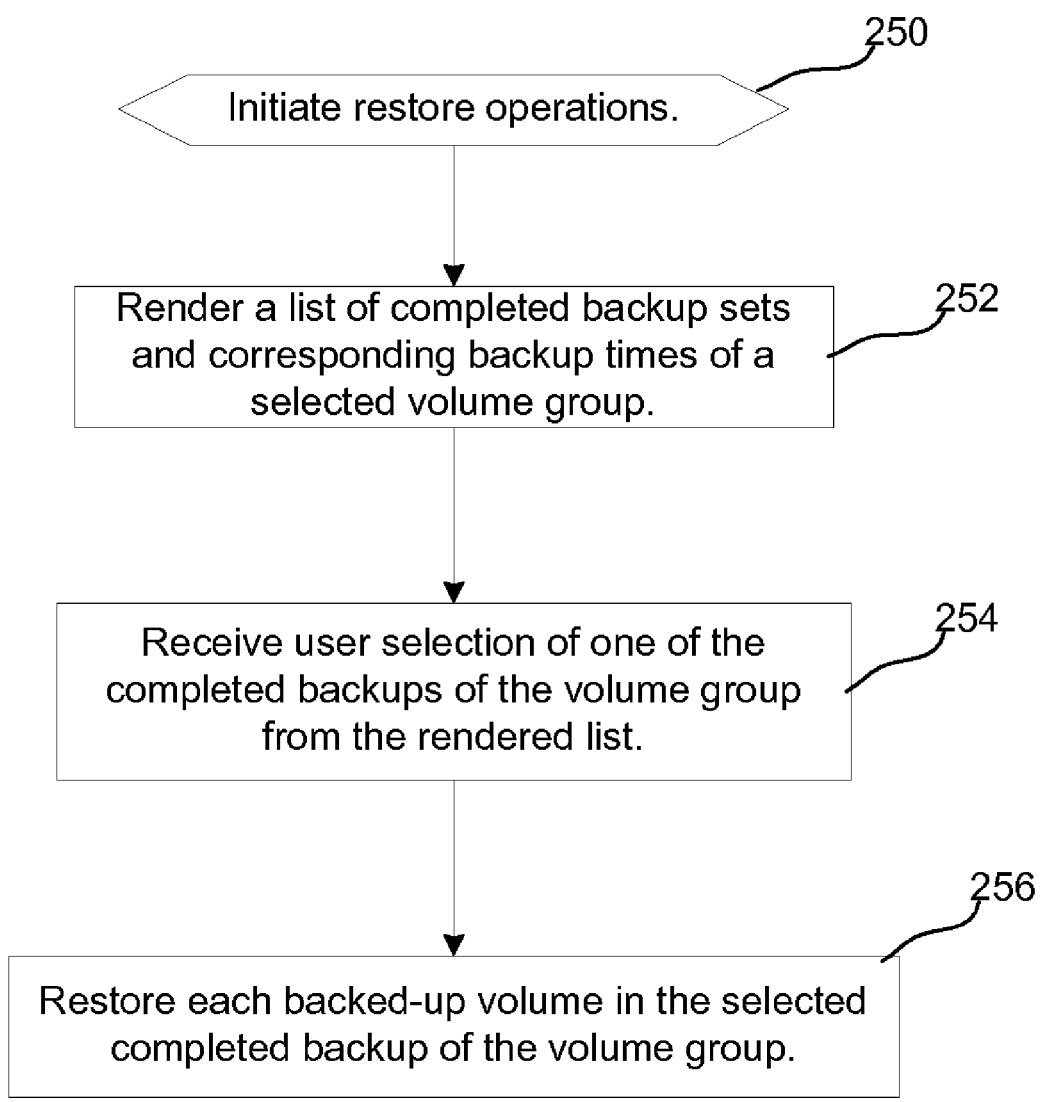
FIG. 12 illustrates an embodiment of operations to restore a backup of a volume group.

FIG. 12 illustrates an embodiment of operations performed by the backup services 16 to enable an operator or application to restore the volumes 20 for a selected volume group 18. Upon an operator or program invoking (at block 250) restore operations through the backup services 16, the backup services 16 renders (at block 252) a list of completed backup sets 78a . . . 78n and corresponding backup times 76a . . . 76n of a selected volume group 18, which may be accessed from the volume group backup information 70 (FIG. 4) for the selected volume group. Upon receiving (at block 254) user or application selection of one of the completed backup sets 78a . . . 78n of the volume group 18 from the rendered list, the backup services 16 restores (at block 256) each backed-up volume 20 in the selected completed backup of the volume group 18. The backup services 16 may restore a volume from the virtual copy 26 or target volume 22. In one embodiment, the backup services 16 may use a FlashCopy in the reverse direction to restore.

Described embodiments provide techniques to automatically perform backup operations with respect to all the volumes of a selected volume group. With the described embodiments, the backup services upon being invoked to backup a volume group automatically performs a backup operation with respect to each volume in the volume group to maintain backup information for the volume group as a whole. Further embodiments provide techniques to restore the volumes for a selected volume group.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 13:
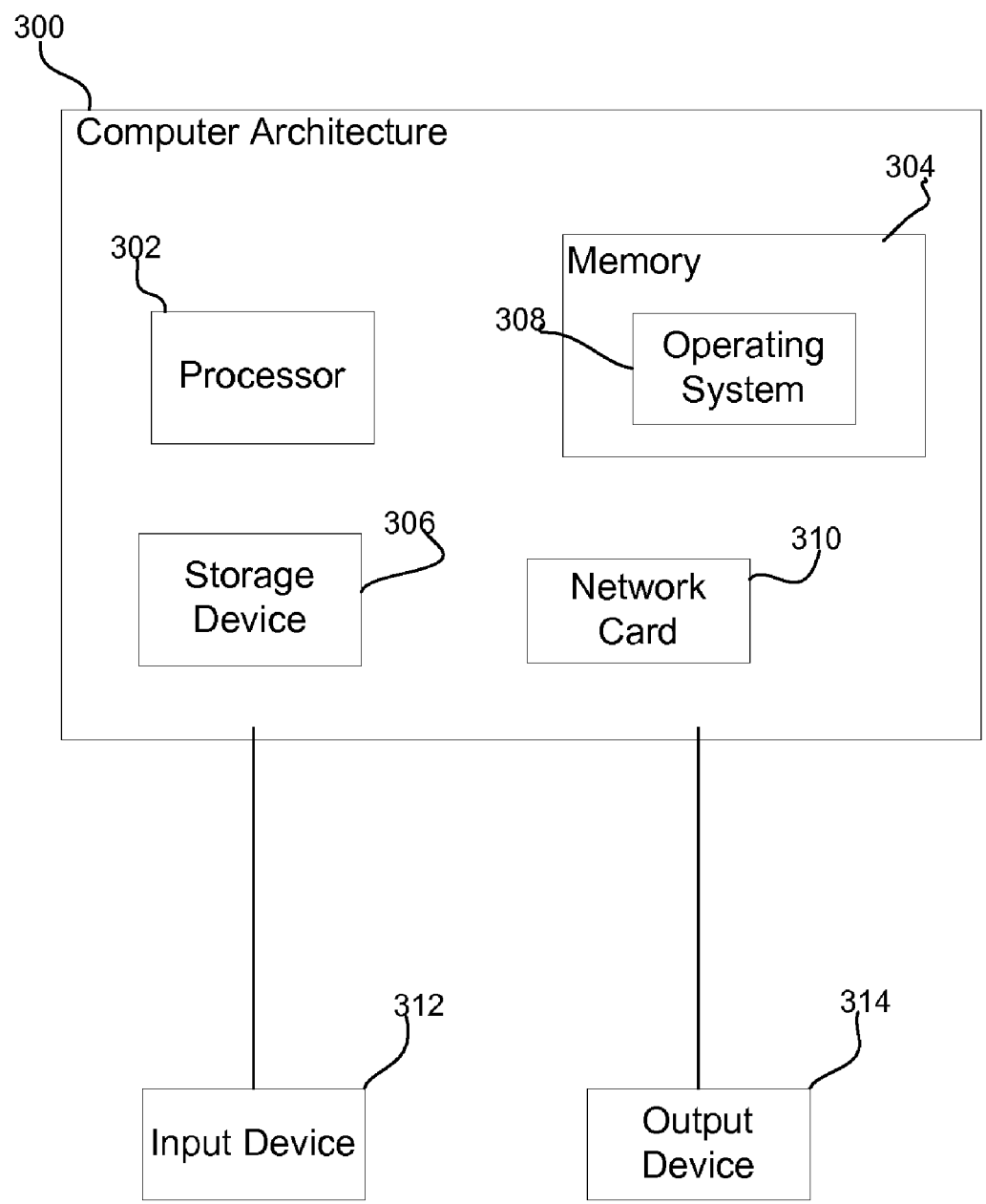
FIG. 13 illustrates an embodiment of a computer architecture that may be used with the systems in FIG. 1.

FIG. 13 illustrates one implementation of a computer architecture 300 that may be implemented at the hosts 2 and storage server 4 of FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 312, and may include a keyboard, mouse, pen-stylus, microphone, touch sensitive display screen, or any other activation or input mechanism known in the art. An output device 314 is capable of rendering information transmitted from the processor 312, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements or when used with different instances of the same element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7, 8, 9, 10, 11, and 12 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining information on a volume group associating a plurality of volumes and backup settings, wherein the backup settings indicate a maximum number of backups to maintain for the volume group;
   selecting a volume group to which the backup settings apply, wherein a volume group associates hosts and volumes, indicating the hosts that are enabled to access the volumes in the volume group; and
   invoking automatic backup operations for the selected volume group to perform with respect to all volumes in the volume group, comprising:
      generating backup information for the volume group indicating backups performed with respect to the volumes associated with the volume group and a backup frequency at which to backup the volumes associated with the volume group;
      processing the backup information for the volume group to determine whether to perform a backup with respect to the volume group according to the backup settings and according to the backup frequency for the volume group; and backing-up each volume in the volume group in response to determining to perform the backup operation for the volume group by performing:
determining whether the backup information for the volume group indicates a number of completed backups for the volume group equals the maximum number of backups;
allocating a target volume for each volume in the volume group, wherein each volume in the volume group is backed-up to one of the allocated target volumes, and wherein allocating the target volumes for the volumes in the volume group comprises using the target volumes from a previous backup of the volume group in response to determining that the number of completed backups for the volume group equals the maximum number of backups;
performing operations to backup the volumes in the volume group to the allocated target volumes so that the data in all the volumes in the volume group is consistent as of a point-in-time, wherein a backup of the volume group completes in response to successfully backing-up each volume in the volume group; and
indicating the completed backup for the volume group in the backup information for the volume group in response to completing the backup of all the volumes in the volume group.

2. The method of claim 1, wherein the processing of the backup information on the volume group to determine whether to perform the backup operation comprises:
determining a most recent completed backup from the backup information for the volume group;
determining whether a difference of a current time and the most recent completed backup exceeds the backup frequency, wherein the backup is performed with respect to each volume in the volume group in response to determining that the difference of the current time and the most recent completed backup exceeds the backup frequency.

3. The method of claim 1, wherein backing-up each volume comprises:
creating a virtual copy of the volume, wherein the backup is completed in response to creating the virtual copy; and
copying data from the volume indicated in the virtual copy to the target volume, wherein the volumes to backup and target volumes are implemented in hard disk drives.

4. The method of claim 1, wherein allocating the target volume for each volume in the volume group in response to determining that the number of completed backups for the volume group does not equal the maximum number of backups comprises:
determining a target volume having at least one of an equal size, performance, and reliability as the volume to backup, wherein the allocated target volume comprises the determined target volume.

5. The method of claim 1, further comprising:
rendering a list of completed backups of the volume group at different times;
receiving user selection of one of the completed backups of the volume group from the rendered list; and
restoring each backed-up volume associated with the selected completed backup of the volume group in response to the user selection of the completed backup of the volume group.

6. The method of claim 1, wherein the automatic backup operations for the volume group further comprise:
initiating a condition for each volume in the volume group to not accept further writes for the volume until the backup of the volume completes.

7. The method of claim 6, wherein initiating the condition further comprises communicating with applications that write to the volumes in the volume group to quiesce all writes to the volumes in the volume group, further comprising:
communicating with the applications to end quiescing of writes to the volumes in the volume group in response to completing the backup of the volumes in the volume group.

8. The method of claim 1, wherein the automatic backup operations for the volume group further comprise:
communicating with a storage server to cause the storage server to perform consistency operations on the volumes in the volume group to ensure that the data in the backup of each volume in the volume group is part of a consistency group.

9. The method of claim 8, wherein the consistency operations performed by the storage server comprises:
destaging cached writes to the volumes in the volume group to a storage system including the volumes, wherein the volumes are backed-up in response to completing the destaging of the cached writes to the volumes in the storage system.

10. The method of claim 1, wherein selecting a volume group to which the backup settings apply and defining the backup settings associated with the volume group are performed automatically without user intervention.

11. The method of claim 1, further comprising:
communicating with the hosts that write to the volumes in the volume group to prepare for the backup operations for the volume group;
receiving communication from the hosts that the hosts have completed preparations for the backup operations, wherein the backing-up of each of the volumes in the volume group is performed in response to receiving the communication from the hosts.

12. The method of claim 11, wherein the communications with the hosts cause each host to perform at least one of quiescing all writes to the volumes in the volume group and flushing a host cache to write modified writes to the volumes.

13. A system in communication with host systems and at least one storage having volumes, comprising:
a processor;
a computer readable storage media including information on a volume group associating a plurality of the volumes and backup settings, wherein the backup settings indicate a maximum number of backups to maintain for the volume group;
backup services in the computer readable storage media executed by the processor to perform operations, the operations comprising:
selecting a volume group to which the backup settings apply, wherein a volume group associates hosts and volumes, indicating the hosts that are enabled to access the volumes in the volume group; and
invoking automatic backup operations for the selected volume group to perform with respect to all volumes in the volume group, comprising:
generating backup information for the volume group indicating backups performed with respect to the volumes associated with the volume group and a backup frequency at which to backup the volumes associated with the volume group;

processing the backup information for the volume group to determine whether to perform a backup with respect to the volume group and according to the backup settings according to the backup frequency for the volume group; and backing-up each volume in the volume group in response to determining to perform the backup operation for the volume group by performing:

determining whether the backup information for the volume group indicates a number of completed backups for the volume group equals the maximum number of backups;

allocating a target volume for each volume in the volume group, wherein each volume in the volume group is backed-up to one of the allocated target volumes, and wherein allocating the target volumes for the volumes in the volume group comprises using the target volumes from a previous backup of the volume group in response to determining that the number of completed backups for the volume group equals the maximum number of backups;

performing operations to backup the volumes in the volume group to the allocated target volumes so that the data in all the volumes in the volume group is consistent as of a point-in-time, wherein the backup of the volume group completes in response to successfully backing-up each volume in the volume group; and indicating the completed backup for the volume group in the backup information for the volume group in response to completing the backup of all the volumes in the volume group.

14. The system of claim 13, wherein the processing of the backup information on the volume group to determine whether to perform the backup operation comprises:

determining a most recent completed backup from the backup information for the volume group;

determining whether a difference of a current time and the most recent completed backup exceeds the backup frequency, wherein the backup is performed with respect to each volume in the volume group in response to determining that the difference of the current time and the most recent completed backup exceeds the backup frequency.

15. The system of claim 13, wherein backing-up each volume comprises:

creating a virtual copy of the volume, wherein the backup is completed in response to creating the virtual copy; and copying data from the volume indicated in the virtual copy to the target volume, wherein the volumes to backup and target volumes are implemented in hard disk drives.

16. The system of claim 13, wherein the allocating the target volume for each volume in the volume group in response to determining that the number of completed backups for the volume group does not equal the maximum number of backups comprises:

determining a target volume having at least one of an equal size, performance, and reliability as the volume to backup, wherein the allocated target volume comprises the determined target volume.

17. The system of claim 13, wherein the operations further comprise:

rendering a list of completed backups of the volume group at different times;

receiving user selection of one of the completed backups of the volume group from the rendered list; and restoring each backed-up volume associated with the selected completed backup of the volume group in response to the user selection of the completed backup of the volume group.

18. The system of claim 13, wherein the automatic backup operations for the volume group further comprise:

initiating a condition for each volume in the volume group to not accept further writes for the volume until the backup of the volume completes.

19. The system of claim 18, wherein initiating the condition further comprises communicating with applications that write to the volumes in the volume group to quiesce all writes to the volumes in the volume group, wherein the operations further comprise:

communicating with the applications to end quiescing of writes to the volumes in the volume group in response to completing the backup of the volumes in the volume group.

20. The system of claim 13, wherein the automatic backup operations for the volume group further comprises:

communicating with a storage server to cause the storage server to perform consistency operations on the volumes in the volume group to ensure that the data in the backup of each volume in the volume group is part of a consistency group.

21. The system of claim 20, wherein the consistency operations performed by the storage server comprises:

destaging cached writes to the volumes in the volume group to a storage system including the volumes, wherein the volumes are backed-up in response to completing the destaging of the cached writes to the volumes in the storage system.

22. The system of claim 13, wherein selecting a volume group to which the backup settings apply and defining the backup settings associated with the volume group are performed automatically without user intervention.

23. An article of manufacture comprising a computer readable storage medium having code executed to backup volumes in a storage, wherein hosts access the volumes over a network, and wherein the code is further enabled to cause operations, the operations comprising:

maintaining information on a volume group associating a plurality of volumes and backup settings, wherein the backup settings indicate a maximum number of backups to maintain for the volume group;

selecting a volume group to which the backup settings apply, wherein a volume group associates hosts and volumes, indicating the hosts that are enabled to access the volumes in the volume group; and invoking automatic backup operations for the selected volume group to perform with respect to all volumes in the volume group, comprising:

generating backup information for the volume group indicating backups performed with respect to the volumes associated with the volume group and a backup frequency at which to backup the volumes associated with the volume group;

processing the backup information for the volume group to determine whether to perform a backup with respect to the volume group according to the backup settings and according to the backup frequency for the volume group; and backing-up each volume in the volume group in response to determining to perform the backup operation for the volume group by performing:

determining whether the backup information for the volume group indicates a number of completed backups for the volume group equals the maximum number of backups;

allocating a target volume for each volume in the volume group, wherein each volume in the volume group is backed-up to one of the allocated target volumes, and wherein allocating the target volumes for the volumes in the volume group comprises using the target volumes from a previous backup of the volume group in response to determining that the number of completed backups for the volume group equals the maximum number of backups;

performing operations to backup the volumes in the volume group to the allocated target volumes so that the data in all the volumes in the volume group is consistent as of a point-in-time, wherein a backup of the volume group completes in response to successfully backing-up each volume in the volume group; and indicating the completed backup for the volume group in the backup information for the volume group in response to completing the backup of all the volumes in the volume group.

24. The article of manufacture of claim 23, wherein the processing of the backup information on the volume group to determine whether to perform the backup operation comprises:

determining a most recent completed backup from the backup information for the volume group;

determining whether a difference of a current time and the most recent completed backup exceeds the backup frequency, wherein the backup is performed with respect to each volume in the volume group in response to determining that the difference of the current time and the most recent completed backup exceeds the backup frequency.

25. The article of manufacture of claim 23, wherein backing-up each volume comprises:

creating a virtual copy of the volume, wherein the backup is completed in response to creating the virtual copy; and copying data from the volume indicated in the virtual copy to the target volume, wherein the volumes to backup and target volumes are implemented in hard disk drives.

26. The article of manufacture of claim 23, wherein allocating the target volume for each volume in the volume group in response to determining that the number of completed backups for the volume group does not equal the maximum number of backups comprises:

determining a target volume having at least one of an equal size, performance, and reliability as the volume to backup, wherein the allocated target volume comprises the determined target volume.

27. The article of manufacture of claim 23, further comprising:

rendering a list of completed backups of the volume group at different times;

receiving user selection of one of the completed backups of the volume group from the rendered list; and restoring each backed-up volume associated with the selected completed backup of the volume group in response to the user selection of the completed backup of the volume group.

28. The article of manufacture of claim 23, wherein the automatic backup operations for the volume group further comprise:

initiating a condition for each volume in the volume group to not accept further writes for the volume until the backup of the volume completes.

29. The article of manufacture of claim 28, wherein initiating the condition further comprises communicating with applications that write to the volumes in the volume group to quiesce all writes to the volumes in the volume group, further comprising:

communicating with the applications to end quiescing of writes to the volumes in the volume group in response to completing the backup of the volumes in the volume group.

30. The article of manufacture of claim 23, wherein the automatic backup operations for the volume group further comprises:

communicating with a storage server to cause the storage server to perform consistency operations on the volumes in the volume group to ensure that the data in the backup of each volume in the volume group is part of a consistency group.

31. The article of manufacture of claim 30, wherein the consistency operations performed by the storage server comprises:

destaging cached writes to the volumes in the volume group to a storage system including the volumes, wherein the volumes are backed-up in response to completing the destaging of the cached writes to the volumes in the storage system.

32. The article of manufacture of claim 23, wherein selecting a volume group to which the backup settings apply and defining the backup settings associated with the volume group are performed automatically without user intervention.

* * * * *